United States Patent
Atcheson et al.

(10) Patent No.: US 7,461,055 B2
(45) Date of Patent: *Dec. 2, 2008

(54) METHOD AND APPARATUS FOR RECOMMENDING SELECTIONS BASED ON PREFERENCES IN A MULTI-USER SYSTEM

(75) Inventors: John Atcheson, San Francisco, CA (US); James R. Miller, III, Stanford, CA (US)

(73) Assignee: RealNetworks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/383,734

(22) Filed: May 16, 2006

(65) Prior Publication Data
US 2006/0265369 A1 Nov. 23, 2006

Related U.S. Application Data

(63) Continuation of application No. 09/874,563, filed on Jun. 5, 2001, now Pat. No. 7,050,988, which is a continuation of application No. 08/707,773, filed on Sep. 4, 1996, now abandoned.

(51) Int. Cl.
*G06F 7/00* (2006.01)
(52) U.S. Cl. ............... 707/3; 707/1; 707/5; 707/8; 705/27; 705/26; 705/1; 705/10
(58) Field of Classification Search ............. 705/14; 707/3
See application file for complete search history.

(56) References Cited

U.S. PATENT DOCUMENTS 4,775,935 A * 10/1988 Yourick ............... 715/811
4,866,661 A * 9/1989 de Prins ............... 235/382
4,870,579 A * 9/1989 Hey ..................... 705/27
4,908,758 A * 3/1990 Sanders ................ 434/323
5,084,819 A * 1/1992 Dewey et al. .......... 434/262
5,122,952 A * 6/1992 Minkus ................ 705/26
5,200,909 A * 4/1993 Juergens .............. 702/25
5,559,714 A * 9/1996 Banks et al. .......... 700/233
5,798,785 A * 8/1998 Hendricks et al. ..... 725/46
2007/0061023 A1* 3/2007 Hoffberg et al. ...... 700/83

OTHER PUBLICATIONS

Nordgren, Layne, "Taste Mate Video Selection System" CD-ROM Professional v6n4 pp. 166-167, Jul. 1993, Dialog(R) File 15, Record # 0073403.*

* cited by examiner

*Primary Examiner*—James Myhre
*Assistant Examiner*—Khanh H Le
(74) *Attorney, Agent, or Firm*—Axios Law Group; Adam Philipp

(57) ABSTRACT

A system for determining selections that a user is likely to be interested in. The determination is made based on the user's prior indicated preferences. The user designates his or her preferred selections as entries in a user's preference list. Entries in the user's list are compared with entries in the other users' lists. When a significant number of matches have been found between two lists, the unmatched entries of the other user's preference list are extracted. The unmatched entries are further processed. Those unmatched entries with a high correlation to the user's preference list are presented to the user as selections in which the user is likely to be interested.

8 Claims, 8 Drawing Sheets

$$
352 \begin{cases}
b & (5 \times 0.4) + (5 \times 0.3) + (0 \times 0.2) + (5 \times 0.1) = 3.1 \\
c & (4 \times 0.4) + (5 \times 0.3) + (4 \times 0.2) + (0 \times 0.1) = 3.9 \\
q & (3 \times 0.4) + (3 \times 0.3) + (5 \times 0.2) + (3 \times 0.1) = 3.4 \\
z & (2 \times 0.4) + (0 \times 0.3) + (0 \times 0.2) + (2 \times 0.1) = 1.0 \\
t & (1 \times 0.4) + (0 \times 0.3) + (1 \times 0.2) + (0 \times 0.1) = 0.6 \\
f & (0 \times 0.4) + (4 \times 0.3) + (3 \times 0.2) + (4 \times 0.1) = 2.2 \\
e & (0 \times 0.4) + (1 \times 0.3) + (2 \times 0.2) + (1 \times 0.1) = 0.8
\end{cases}
$$

350

354 → b (0.40)

c
q
z
t
f
e

360 c
q
b
f
z
e
t (0.30)

(0.20)

(0.10)

SELECTION LIST 4 b
c
q
z
t

SELECTION LIST 3 c
f
q
b
e

SELECTION LIST 2 q
c
f
e
t

SELECTION LIST 1 b
f
q
z
e

FIG. 5.

METHOD AND APPARATUS FOR RECOMMENDING SELECTIONS BASED ON PREFERENCES IN A MULTI-USER SYSTEM

CROSS-REFERENCE TO RELATED APPLICATIONS

This application is a continuation of U.S. patent application Ser. No. 09/874,563 filed on Jun. 5, 2001, which is a continuation of U.S. patent application Ser. No. 08/707,773 filed Sep. 4, 1996, which is a continuation of U.S. patent application Ser. No. 08/119,793 filed Sep. 9, 1993 (now issued as U.S. Pat. No. 5,583,763), all entitled METHOD AND APPARATUS FOR RECOMMENDING SELECTIONS BASED ON PREFERENCES IN A MULTI-USER SYSTEM, with the named inventors John Atcheson and James R. Miller, III, all of which are hereby incorporated in their entireties by reference.

BACKGROUND OF THE INVENTION

The generation, replication and transmission of information by automated technology has far surpassed a person's ability to keep up with the information. Not only is this true in the business world, but our leisure activities also involve sorting through an overwhelming number of choices and making intelligent selections. For example, there is an abundance of entertainment in digital-audio or digital-video form, such as compact discs ("CD's"), mini-discs, digital audio tape ("DAT"), laser discs, computer graphics, high-definition television ("HDTV"), etc. The accelerating ability of communication systems to convey this information virtually instantaneously means that we have access to many thousands of selections.

The trend is for computers to be integrated with household devices, such as telephones or televisions, giving rise to "smart phones" or "intelligent" or "interactive" televisions. A telephone with computer capability could be used to "download" digital information, representing, for example, music selections, into the memory of the telephone for later playback. Alternatively, the downloaded information could be written to a medium such as a writeable compact disc. Thus, the smart phone would be capable of downloading high-fidelity music onto a CD that could be played at the user's leisure on his or her sophisticated stereo system. Since the telephone is connected to a vast network, such a system would provide an efficient method of exchange of sound information. In effect, a user could, for example, "dial-up" a central processor and employ a push-button phone or other input device to request music by the user's favorite recording artist and have it downloaded into the user's home. A similar setup is possible for visual images downloaded to an interactive television via, e.g., a cable network hat connects the interactive television to a central site where movies are stored and available for downloading.

However, one problem with these systems is that it is often difficult for a user to keep abreast of all of the possible selections for sound and image data, that is, current releases by a favorite recording artist or current movies that might be of interest to the user. The speed with which new entertainment selections are provided, not to mention the past decades of audio and visual works already in existence, results in a huge number of selections that is ever-growing.

One way for a user, or subject, to make a selection from a large collection of digital "objects" is to allow the user to input selection information into a network. The selection information is then sent to the central or host processor which categorizes the types of objects, e.g., music or video selections, that are of interest to the user and presents the user with these categories of selections. However, the categories are usually broad.

For example, in the music realm a user might make selections in the categories of "country music" or "jazz." These categories are extremely broad, each encompassing many thousands of recordings. On the other hand a user might indicate a specific artist, although this is extremely limiting in that only recordings by that specific artist can logically be associated with the user's selection. Also, this method of having the user provide category selections places the burden of keeping track of new developments on the user himself. The categories may change, for example, rock music has split into various other categories such as heavy-metal, modern, and alternative. Category selection is also limiting to the user since it can only provide what the user knows how to ask for.

SUMMARY OF THE INVENTION

The present invention provides an efficient means for presenting a user with recommended selections from a large number of possible choices. The invention is applicable to any type of information "objects" that can be ordered according to the preferences of a user, or "subject." Preference information from the users is obtained via the network and the recommended selections are communicated to the users over the network. In a preferred embodiment of the invention, the objects are digital sound recordings.

In a first embodiment, the invention comprises a method executing on a computer system which includes a processor, database, an input device, and an output device. The database includes a plurality of data files, each data file containing a plurality of preferences. A target user inputs signals to indicate a set of preferences. The database is searched to determine the number of user preferences that match preferences in the data files. If the number of matched preferences for a given data file is above a predetermined threshold, the non-matching preferences in the data file are output as recommended selections to the user.

Thus, the invention operates on the assumption that if two people have similar tastes in music, it is likely that the preferences of one will be desired by the other.

A second embodiment of the invention uses a computer system including a processor, database, input device and an output device. The processor is used to store pairs of ranked objects in the database. A ranking number is associated with each of the pairs. A user of the system selects an object, and occurrences of the selected object in the pairs are detected. For each pair in which the selected object occurs, the object in the pair that does not match the selected object is determined. The processor is used to order all non-matching objects into a list according to the ranking number for the non-matching object's pair. Finally, the ordered list is output as a list of recommended objects.

Various parameters of the systems described above are adjustable. These parameters include the size of the list of preferences associated with each user and the number of matches required between two users before presenting the matching user with the matched user's unmatched selections. Also, the manner of weighting and ordering unmatched preferences is adjustable.

BRIEF DESCRIPTION OF THE DRAWINGS

FIG. 5 shows a detailed example of the execution of steps in FIG. 3;

DESCRIPTION OF A PREFERRED EMBODIMENT

Figure 1:
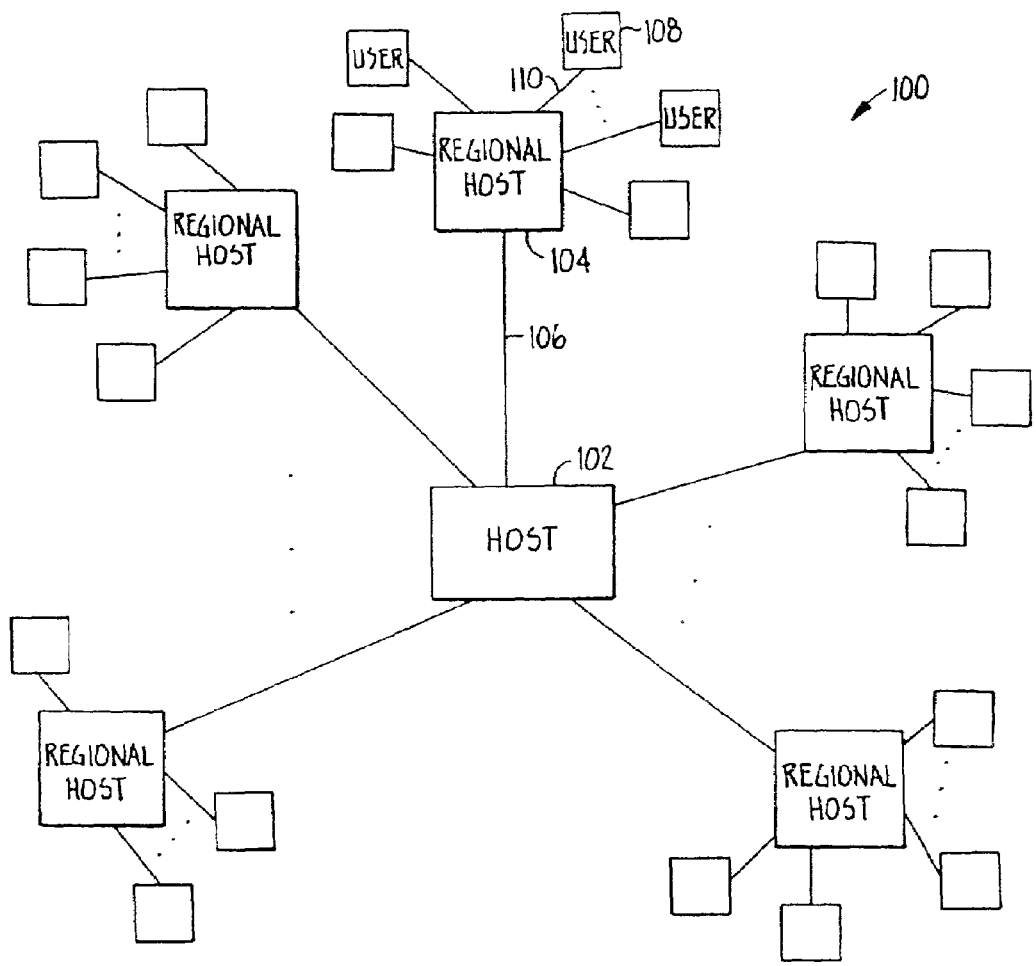
FIG. 1 illustrates a portion of a network used to transfer information in the present invention.

FIG. 1 shows a portion of a network 100 used to transfer information in a preferred embodiment of the present invention. In FIG. 1, network 100 includes host processing station 102 that is the storage center for information to be distributed, such as sound or image information. Regional hosts such as regional host 104 are connected to host 102 via communication links such as link 106. The regional hosts are used to serve users of network 100.

For example, regional host 104 is connected to user terminal 108 through user link 110. The regional hosts act as "front ends" to host processing station 102. A regional host performs the input and output (I/O) functions for each of the multiple user terminals connected to it. The regional host may include a large amount of local storage for containing information such as user selections, user preferences, sound and/or image information, as discussed below, similar to host processing station 102.

FIG. 1 is illustrative of but one configuration of a network to implement the present invention. In FIG. 1, any interconnection arrangement between host processing station 102 and the regional hosts is possible. For example, host processing station 102 can be connected to regional hosts via a star, ring, bus, or other connection scheme. Links such as link 106 can be by hardwire connection, fiber optics, radio frequency communication, etc. Regional hosts can be stand-alone computer systems connected to mass storage devices, or can be networks in themselves. The user links such as user link 110 can be achieved by any means known in the art. A preferred implementation of user links is by existing telephone or cable television networks. User terminals such as user terminal 108 can be a personal computer, or telephone or television with digital transmit/receive capability.

In a preferred embodiment, the central host processor station includes one or more computers connected to mass storage devices such as multiple disk drives. The link between host and regional host is by hardwire, fiber optic or satellite transmission, as available. A regional host operates as a communications control station between hundreds, or thousands, of user terminals and the host processing station. The regional host has local storage that serves primarily as a buffer for I/O. However, many of the functions discussed herein regarding the host processing station also can be performed by the regional hosts, as desired.

In a preferred embodiment, the present invention is adapted to a music selection and distribution service that provides users with recommended selections of songs that have a high likelihood of suiting their tastes. This system uses the user's household telephone to accept input in the form of touchtone keypad key presses to allow the user to select recordings from a menu and have the recordings delivered to the user's home. Delivery of the recordings can be by traditional methods such as sending a compact disk ("CD") through the mail, or by more advanced methods such as "downloading" digital information to a user's computer for playback either from the computer or through a high fidelity home sound system.

For example, the downloaded digital information could be used to create a CD on a writable CD disk drive attached to the computer. Alternatively, the digital information could be written to a digital audio tape (DAT) format. Also available today is a "mini disk" format which is a writable format. Other possibilities for transferring digital recording information to allow the user to play it back at their leisure are possible. Thus, one aspect of the invention provides a user interface for making selections from the user's home.

To continue with the music selection service example, a user dials a number and is connected into a network to which the host processing station is connected. The user is given a menu of choices for proceeding within the service. One option is for the user to define "preferences", or a list of their favorite artists. For example, a list of the top ten favorite recording artists is maintained for each user of the service. A user is given the opportunity to define or modify the list of top ten favorite artists by using the buttons on their telephone or by operating the keyboard or mouse or other input device on their computer. The user can also access a list of recommended selections which the service has determined might interest the user. The manner in which the suggested selections are generated is described in detail, below.

Another option the service provides for the user is the ability to preview recordings before the user downloads them. That is, the user can hear a short segment of the musical recording over the telephone before deciding to purchase and download the recording. The preview can be of suggested selections provided by the service, selections the user has heard about and can identify by name, or selections of a specific artist, band, or style of music (e.g., country, jazz, rock).

The present invention uses the user's preference list to Identify selections that would most likely be of interest to the user. This is done by correlating the user's preference list with the preference lists of other users of the service. The correlation is performed in an efficient manner since all of the preference list information is maintained at the centralized host processing station discussed above in connection with FIG. 1. While it is possible that the correlation of user preferences can be done at the regional host level (to take advantage of geographical dependencies in user preferences, for example), it is advantageous to include as many users as possible in the correlation in order to achieve a more reliable correlation.

Figure 2:
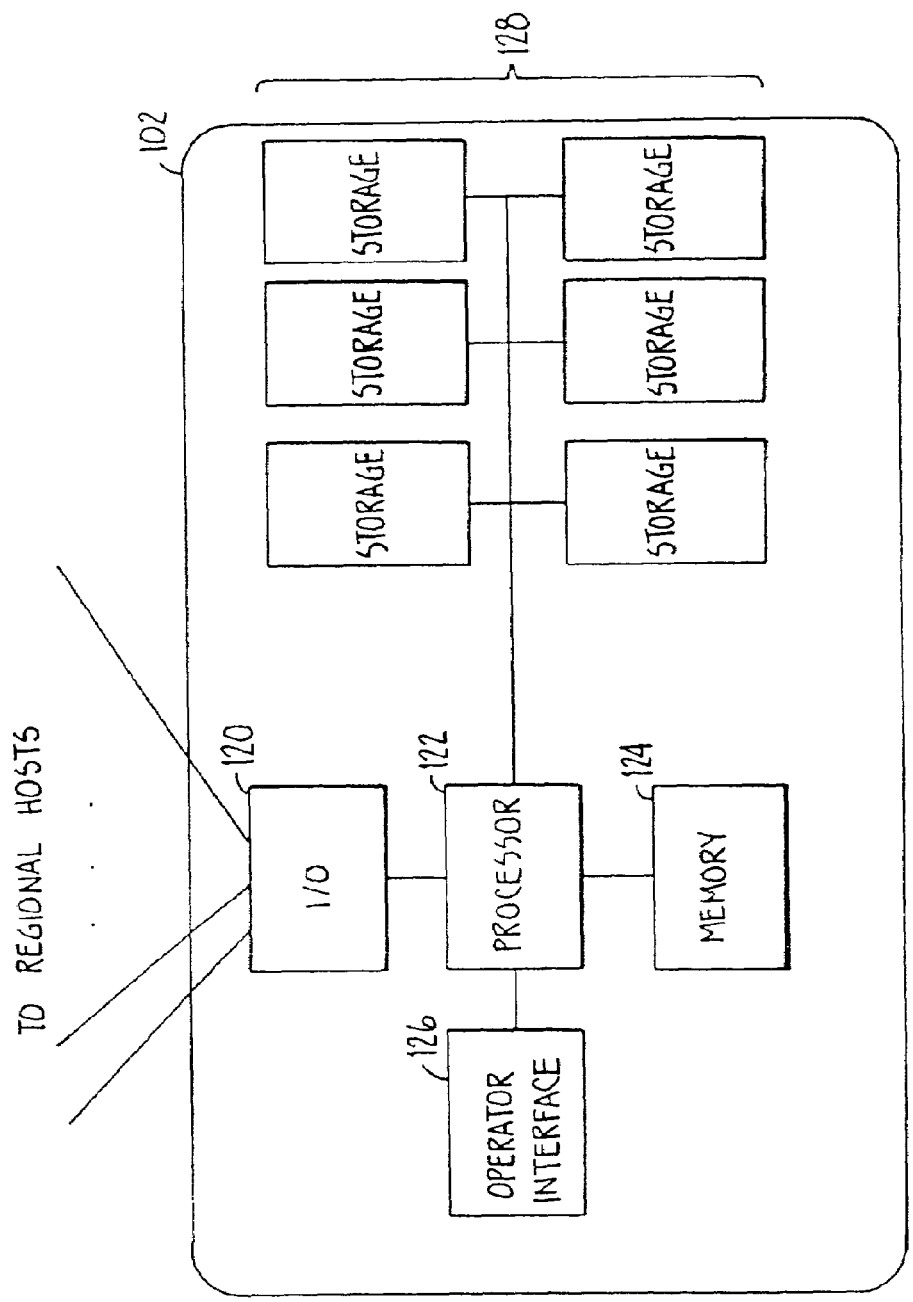
FIG. 2 is a block diagram of the host processing station of FIG. 1.

FIG. 2 is a block diagram of the host processing station 102 of FIG. 1. FIG. 2 shows host processing station 102 including an I/O controller 120, processor 122, memory 124, operator interface 126, and storage devices at 128.

I/O controller 120 transmits and receives signals from the regional host, such as regional host 104 of FIG. 1. I/O controller 120 transfers information to and from processor 122. Processor 122 is connected to mass storage devices at 128. Processor 122 is also connected to memory 124. Memory 124 is typically solid state memory for fast random access and is used, for example, to perform buffering functions, intermediate storage for mathematical calculations, database functions, etc.

Operator interface 126 is connected to processor 122. The operator interface 126 provides a human interface at host processing station 102. By using the operator interface, one can provide better correlations by varying the parameters defining how the correlations are made to user preference lists. The operator interface may be implemented by any means known in the art, such as having the operator type in numbers for various parameter values. The purpose of allowing an operator to adjust parameters from time to time is to "tune" the system, based on a trial and error basis, to achieve the best results. This is necessary since the goal of providing accurate suggested selections is a subjective one.

It will be apparent to one of ordinary skill in the art that many configurations for the host processing station 102 that vary from that of FIG. 2 are possible. Specifically, additional hardware components (functional blocks) may be present in host processing station 102 such as tape drives and additional processors. Any suitable computer system may be used.

Table I and FIGS. 3-5 will be discussed in connection with an explanation of a specific embodiment of a correlation method.

Table I lists the steps to perform "Subject to Object" correlation to generate suggested selections based on a comparison of a user's preference list with the preference lists of other users of the service. The steps of Table I are discussed in reference to FIGS. 3-5 where a detailed discussion of a method for performing the correlation as executed by a computer is discussed.

TABLE I

Subject to Object Correlation
Two or more persons list their favorite objects 1 . . . n.
To generate recommendations for any one particular person
(the "subject"), the following procedure is followed:

Search the database of all other people to see if anyone has listed
n − 1 of the same objects.
Each match will generate one object that was not listed by the
subject. Calculate the total number of occurrences for each such
object and create two rank tables. In the first table, rank from
maximum to minimum the absolute number of occurrences for each
object. In the second table, rank from maximum to minimum the ratio
of the number of occurrences for each object divided by the total
number of occurrences for that object throughout the entire
database (i.e., rank the "normalized" number of occurrences
for each object).
For each object, compare the rankings between the first and second
tables and use them to create a third table. The third table is
comprised of a weighted average of the two rankings. The weighting
of the rankings can range from 100% of the first ranking and 0% of
the second to 0% of the first and 100% of the second, depending on
the level of weighting desired, and provided an identical level of
weighting is applied to all objects. The results in the third table
are then ranked from maximum to minimum. If n > 2, then search the
database of all other people to see if anyone has listed n − 2 of
the same objects, where "n − 2" is the "matchup" number.
Each match will generate two objects that were not listed by the
subject. Calculate the total number of occurrences for the
unlisted objects.
Repeat the above procedure similarly for all values of the matchup
number down to, and including, 1.
Using the ranked weighted average (i.e., the "third") tables
for n − 1 . . . n − (n − 1) searches, create a final table.
The final table is comprised of a weighted average of the weighted
average rankings for n − 1 . . . n − (n − 1) objects
searches. The weighting of the rankings can range from 100% of the
n − 1 table and 0% of the other tables to 100% of the n − (n −
1) table and 0% of all other tables, depending on the level of
weighting desired, and provided the weighting of all tables
combined equals 100%. Rank the results in the final table from
maximum to minimum.
Use this final ranking to provide recommendations to the subject
ranging from most likely to enjoy (the maximum ranked object) to the
least likely to enjoy (the minimum ranked object).

Figure 3:
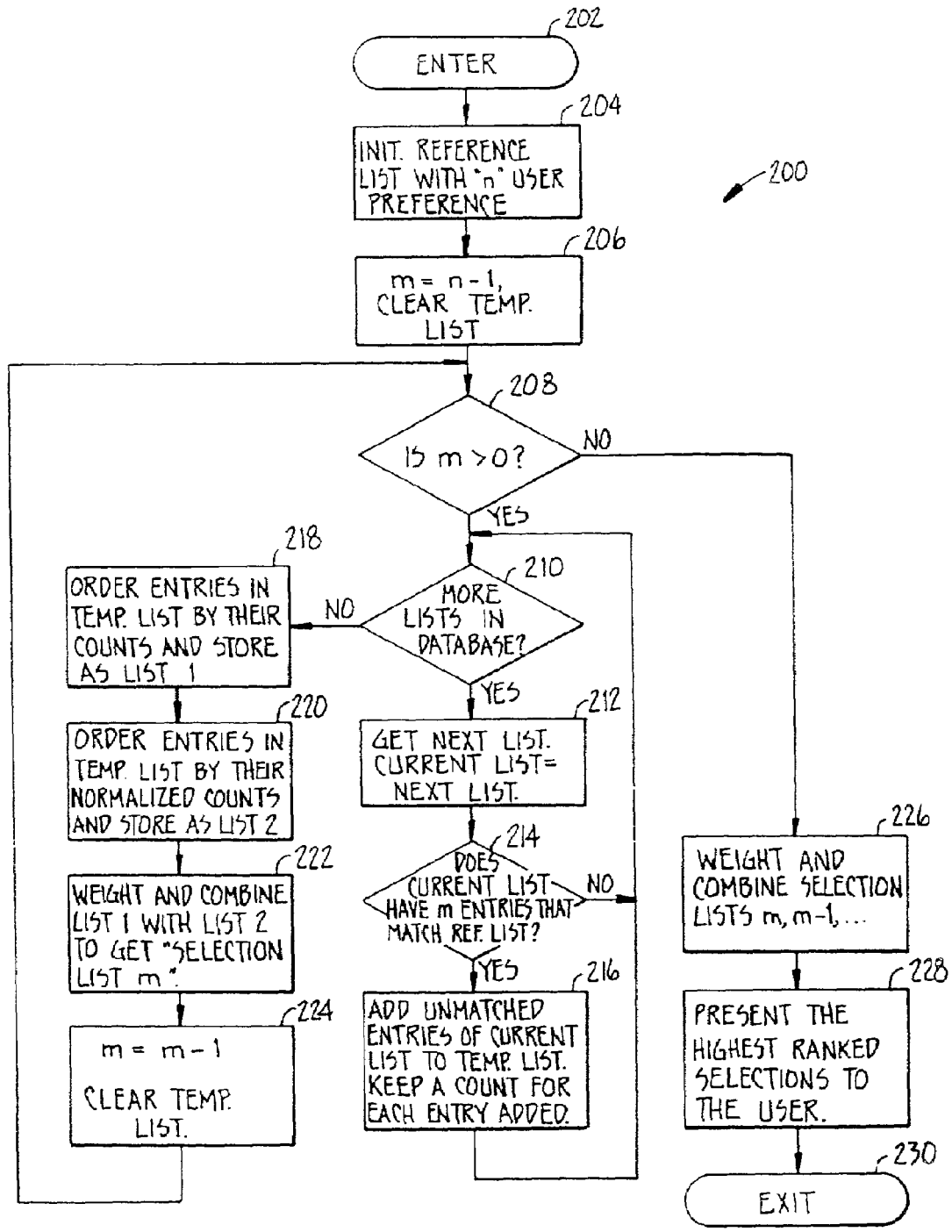
FIG. 3 shows a flowchart of a routine for correlating user preferences in the present invention.

FIG. 3 shows flowchart 200 of a routine for correlating user preferences in the present invention. In a preferred embodiment, the routine corresponding to flowchart 200 of FIG. 3 is executed on a computer system, such as host processing system 102 of FIG. 2.

Flowchart 200 can be implemented with one or more software routines on one or more computers. Further, flowchart 200 illustrates merely the broad logical flow of a routine to accomplish the correlation procedure of the present invention. Other flowcharts implementing suitable correlations will be possible while still remaining within the scope of the present invention. A software routine, or routines, implementing flowchart 200 may be written in any suitable computer language, such as "C", FORTRAN, assembly language or others. For ease of discussion, we will refer to the routine of flowchart 200 as a single routine.

The routine is entered at step 202 where it is assumed that a user preference list exists to which a correlation is to be made with other existing user lists in a computer database. The database could exist, for example, in memory 124 of FIG. 2. In step 204, a "reference list" is initialized with n user preferences. In this example, we assume that user preference lists contain five entries each. Thus, at step 204 of FIG. 3, the reference list is initialized with five entries of a user preference list to which a correlation of preexisting preference lists in the database is sought. In other words, the routine of flowchart 200 will provide selections in the database that have a high likelihood of being desired by the user whose preference list has been submitted to the routine.

At step 206, the variable m is initialized to n−1, that is, m now has the value 4 since n is assumed to be 5 as discussed above. Also at step 206, a "temp. list" is cleared to be used by the routine as described below.

At step 208, a check is made to test whether m is greater than 0. If m is greater than 0, execution proceeds to step 210. In the present example, since m has just been assigned the value 4, the check at 208 is true and execution proceeds to step 210.

At step 210, a check is made as to whether there are predefined preference lists in the database that have not yet been checked against the reference list. Since we have just entered the loop, none of the preference lists in the database has been checked so execution proceeds from step 210 to step 212. At step 212, the next preference list is obtained from the database and made the "current list." At step 214, a check is made as to whether the current list has m entries that match the reference list. In other words, since m has the value 4, there must be four entries in the current list that match four of the five entries in the reference list. Since the reference list contains the user preferences, this means that step 214 of flowchart 200 is attempting to match preexisting preference lists in the database that have at least four entries in common with the user preferences. If a match is found at step 214, execution proceeds to step 216 where the unmatched entries in the current list are included in a "temp. list." In our example of m having the value 4, this would mean that one entry in the current list is not matched in the reference list. This one unmatched entry is added to the temp. list. If the entry already exists in the temp. list, then a count of the number of occurrences of the entry being added to the temp. list is incremented.

After executing step 216, the routine returns to step 210 where a check is again made as to whether there are more unused preference lists in the database. If there are, execution continues to step 212 where, as before, the next list is obtained and checked for four matches against the reference list. If there are four matches, then the unmatched entry of the current list is added to the temp. list and so on. However, if, at step 210, there are no more lists in the database to be checked, execution continues to step 218 where the entries in the temp.

list are ordered according to their counts. This means that entries with high counts are placed higher an the list, "List 1," in step 218.

At step 220, a second list, "List 2," is created in which the entries are ordered according to their normalized counts. As before, in forming List 1, the entries are obtained from the temp. list and are ordered according to their frequency of occurrence as unmatched entries in the current list in the loop of steps 210-216 described above. The method of normalizing the counts is described in more detail below. At step 222, List 1 and List 2 are weighted and combined to generate a "selection list m" where m is an integer value. In the present example, since m has the value 4, List 1 and List 2 will be combined to generate "selection list 4." At step 224, m is decremented (i.e., m now equals 3) and the "temp. list" is cleared. Execution then returns to step 208.

At step 208, a check is made as to whether m is greater than 0, as before. Since m is now 3, execution proceeds to step 210 where the loop of steps 210-216 is executed to find matches in preference lists in the database that have three entries matching with the reference list.

After all of the preference lists in the database have been checked, the loops of steps 210-216 produce a temp. list with the unmatched entries of preference lists in the database that have three or more entries matching the reference list. At step 218, the entries in the temp. list are ordered by their counts as discussed above and stored as List 1. At step 220, the entries are ordered in List 2 similarly to step 218, except that the normalized counts are used to order the entries. At step 222, List 1 and List 2 are weighted and combined into a single list "selection list 3" (since m has the value 3 here). At step 224, m is now set to the value 2 and the temp. list is cleared so that the loop of steps 210-216 will be reentered for the case of m being 2. Thus, selection list 2 and selection list 1 will be formed with an ordered list based on preference lists in the database that have, respectively, 2 and 1 entries matching the reference list.

After m has been decremented to 0, the check at step 208 will result in false and execution will continue to step 226 of FIG. 3. At step 226, the selection lists 4, 3, 2 and 1 are combined to form a single list. Discussion of the details of the weighting and combining of the selection lists is presented below. At step 228, the highest ranked selections of the weighted and combined selection lists generated at step 226 are presented to the user as the result of the correlation routine of flowchart 200.

Finally, the routine is exited at step 230.

Next, FIG. 4 will be discussed to show a specific example of carrying out the steps of the flowchart 200 of FIG. 3.

Figure 4:
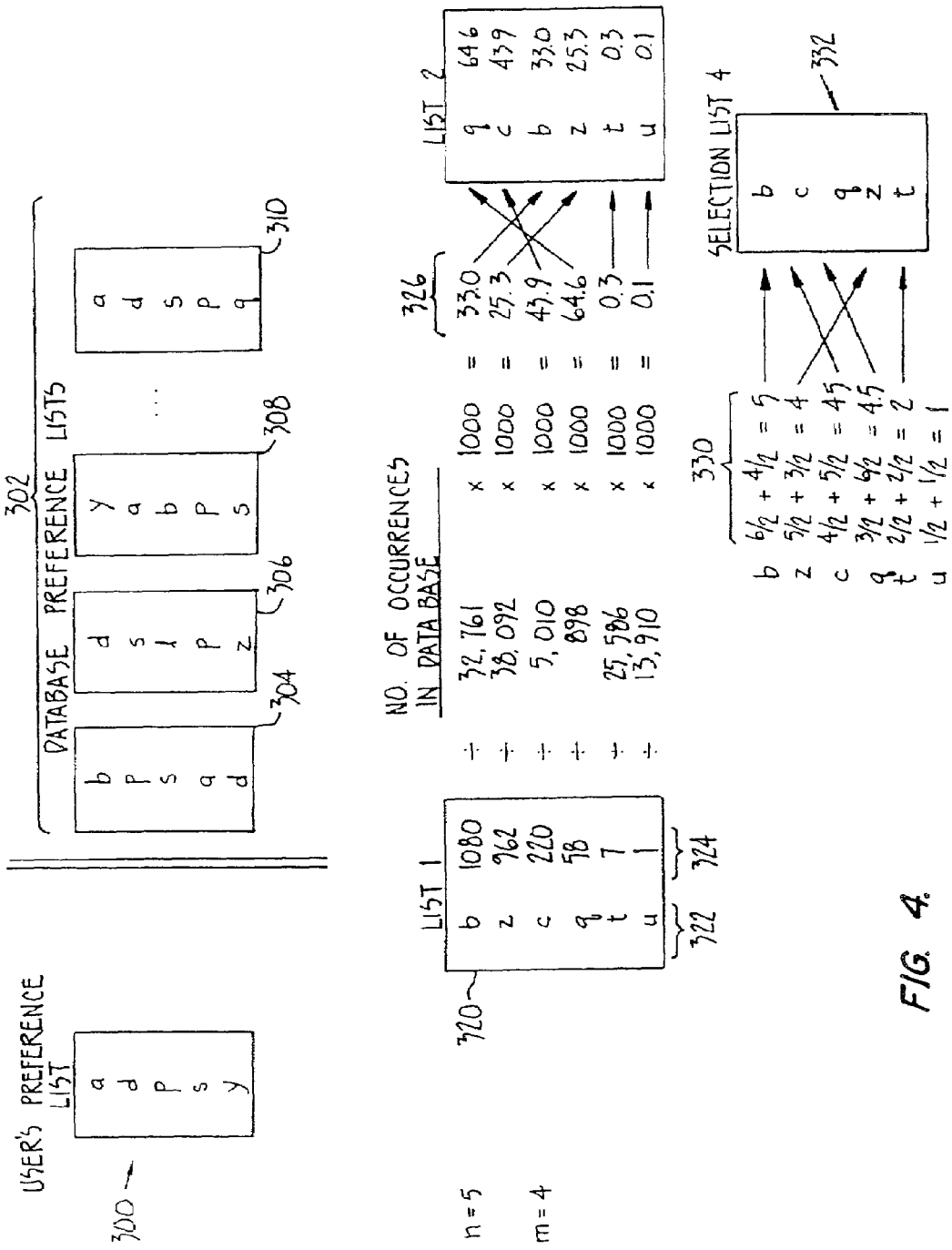
FIG. 4 is an illustration of a specific example of carrying out the steps of the flowchart of FIG. 3.

FIG. 4 shows preference lists, such as user's preference list 300. As shown in FIG. 4, user's preference list 300 has entries a, d, p, s and y. Database preference lists are shown at 302. For example, database preference list 304 includes entries b, p, s, a and d. In a preferred embodiment, entries designated by lower case letters in FIG. 4 will actually be the names of recording artists. Also, the number of preference lists in the database will be very large, on the order of thousands or even tens of thousands of preference lists. N, the number of entries on a user's preference list, is given the value 5 for this example. The specific numbers used here are merely values used for ease of discussion. In practice, all of the parameters, such as n, m, the number of preference lists compared to in the database, and the "weights" to be discussed below, are variable. These parameters are used to adjust the correspondence routine of FIG. 3 to achieve optimal performance. In other embodiments of the invention, different parameters may be used.

Thus, referring to flowchart 200 of FIG. 3 and the preference lists and values of FIG. 4, the following discussion tracks the specific example of FIG. 4 in association with the steps of flowchart 200 of FIG. 3.

Step 204 of FIG. 3 calls for initializing a reference list with the n user preferences. Thus, the reference list (an internal list manipulated and accessed by the processor executing the routine of flowchart 200) will be identical to user's preference list 300. That is, the reference list will have entries a, d, p, s and y in that order. At step 206, m obtains the value 4 (i.e., 5−1) and the temp. list is cleared. At step 208, m will be greater than 0 so that the loop of steps 210-216 is entered to compare the reference list with preference lists in the database, such as those shown at 302 of FIG. 4.

In FIG. 4, user's preference list 300 consists of {a, d, p, s, y} while database preference list 304 consists of {b, p, s, a, d}. Therefore, there are four matching entries, namely, a, d, p, and s. The single unmatching entry in database preference list 304 is entry b. Thus, the entry b is entered into a temp. list (not shown) as occurring once so far. The next time through the loop of step 210-216 of FIG. 3, the next database preference list 306 is compared with the user's preference list 300. The matching entries are d, s, and p. Thus, it is seen that database preference list 306 only has three matching entries with user's preference list 300. Therefore, at step 214 of FIG. 3 where a check is made for m, or at this point 4, matching entries the check will fail and execution will proceed to step 210 without executing step 216. Therefore, none of the entries of data preference list 306 will be inserted into the temp. list.

Next, database preference list 308 is compared with user's preference list 300. This gives entries y, a, p and s as matching entries. Since there are four matching entries, the unmatched entry, b, is again added to temp. list. Since b already exists on the temp. list, the count associated with entry b is incremented to 2. The loop of steps 210-216 continues until the last database preference list 310 is compared to user preference list 300. Database preference list 310 has entries a, d, s and p as matching. This results in the unmatched entry q of database preference list 310 inserted into the temp. list. Finally, there are no more database preference lists to be checked and execution proceeds to step 218 of FIG. 3.

At step 218 of FIG. 3, the entries in the temp. list are ordered according to their counts and stored as List 1. FIG. 4 shows List 1 320 with entries from the temp. list at 322 and the associated counts adjacent to each entry at 324. Thus, List 1 has entry b with a count of 1080, entry z has a count of 962, entry c has a count of 220, entry q has a count of 58, entry t has a count of 7 and entry u has a count of 1.

At step 220, the entries are ordered by their normalized count stored as List 2. In order to calculate the normalized count value, the number of occurrences of each of the entries in the temp. list (i.e., the entries at 322 of List 1, although in a different order) are divided by the total number of times that each entry occurs throughout all preference lists in the database.

In FIG. 4, the entry b of List 1 is determined to have occurred 32,761 times. Similarly, entry z occurs 38,092 times, entry c occurs 5,010 times, entry q occurs 898 times, entry t occurs 25,586 times and entry u occurs 13,910 times. These values are next multiplied by an arbitrary value of 1,000 to yield the normalized count values at 326 of FIG. 4. The entries are then sorted according to their normalized count values and placed in List 2 according to their normalized count values.

List 2 shows the entries of List 1 arranged according to their normalized count values. In List 2, entry q is the highest ranked entry with 64.6 as a normalized count value. Entry c is next, followed by entries b, z, t and u.

In step 222 of FIG. 3, the entries in List 1 and List 2 are weighted and combined to generate a selection list 4. The weighting and combining is a function based upon parameter values that are modified by the operator as discussed above. In this example, the ranking of List 1 and List 2 are weighted evenly, or 50% and 50%. The manner in which the ranking is weighted is by assigning a value of 6 to the highest ranked entry, 5 to the next highest ranked entry and so on to a value of 1 for the lowest ranked entry. The values are divided by 2 since each list is weighted the same and the values are added together for a total weighted combined rank value.

The weighting and combining of step 222 of FIG. 3 is shown at 330 in FIG. 4. Thus, entry b is highest ranked in List 1 and has a value of 6 divided by 2, which is added to value b's ranking in List 2 given a value of 4 divided by 2. Thus, the total combined and weighted value for entry b is 5 as shown in FIG. 4. Similarly, entries z, c, q, t and u are weighted. Selection list 4 at 332 is shown with the five highest ranked entries according to the calculation performed by step 222 of FIG. 3.

As discussed above, at the completion of step 222, a selection list is generated for the current value of m. In the example discussed so far, selection list 4 is created with five entries (entries below the top five are arbitrarily ignored in this implementation) and executes and proceeds to step 224 where m is decremented, the temp. list is cleared and the loop of 210-216 is reentered after step 208.

FIG. 5 shows a detailed example of the execution of steps 226 and 228 of FIG. 3.

FIG. 5 shows selection list 4, selection list 3, selection list 2 and selection list 1. These selection lists were generated by the execution of steps 208-224 of flowchart 200 of FIG. 3 in the manner discussed above. Once generated, execution proceeds to step 226 where the selection lists are combined according to a parameterized formula. As before, the parameters can be varied by the operator of the system. One of the parameters is the length of each selection list which has been set to five in the present example. Thus, even if during execution of steps 210-224, the number of entries of List 1, List 2 or the selection list exceeds 5, ultimately only the highest ranked 5 entries are included in the selection list. Also, the weighting of each selection list is shown to the right of the selection list named at 350 of FIG. 5. Thus, selection list 1 is weighted at 0.10, selection list 2 is weighted at 0.20, selection list 3 is weighted at 0.30 and selection list 4 is weighted as 0.40. The weights for the selection lists can be set by the operator. At 352, the calculations to get the combined and weighted rankings of the entries are shown.

As before, each entry is assigned a point value based on its position in the list. The highest ranked entry is given the value 5, the next highest ranked entry the value 4, and so on, down to the lowest ranked entry which has a value 1. These values are multiplied by the weight for the selection list. So for example, entry b appears in selection list 4, selection list 3 and selection list 1, but does not appear in selection list 2. Thus, the calculation for entry b shown at 354 of FIG. 5 multiplies the ranking of entry b in selection list 4, that is 5, with the weight of selection list 4, that is 0.4. Similarly, a ranking of 2 in selection list 3 is multiplied by the weight for selection list 3 of 0.3. Since entry b is not present in selection list 2, there is no weighted value associated with that list. A ranking of 5 is multiplied by the weight 0.1 for selection list 1. Thus, the total for entry b is a value of 3.1. Similarly, the weighted and combined values for each entry that appears in one of the selection lists is given at 352 of FIG. 5.

The ordered weighted and combined ranking of entries is shown in list 360 of FIG. 5. A predetermined number (another parameter) of the topmost entries of list 360 are presented to the user at step 228 as the results of the correlation routine of flowchart 200. Thus, assuming only the three highest entries are used, the user is presented with entries c, q and b. Remembering that these letters represent recording artists, the user is presented with three artists' names that the user is likely to be interested in.

Thus, the discussion of FIGS. 3, 4 and 5 illustrates how the present invention provides a correlation method for determining selections based on user preferences where the determined selections are likely to be ones that the user is interested in.

Next, Table II and FIGS. 6A, 6B and 7 will be discussed to illustrate a method of making "Object to Object" correlations in the present invention.

Table II lists the steps of a method to perform "Object to Object" correlation to generate suggested selections, or recommendations, based on a comparison of users' preference lists that already exist in the database. The steps of Table II are discussed in reference to FIGS. 6A and 6B where a detailed discussion performing the steps of this method in a computer system is presented.

TABLE II

Object to Object Correlation
One or more persons list their favorite objects 1 ... n.
To generate a list of similarly liked objects based on any
one particular object, the following procedure is followed:

For every possible combination of two objects, identify the number of people having listed both objects.
For each unique combination of two objects, identify which of the two objects has the lesser and the greater number of listings throughout the entire database.
For each unique combination of two objects, calculate two values. For the first value, calculate the ratio of the number of people listing both objects divided by the total number of people listing the lesser object throughout the entire database. For the second value, calculate the ratio of the number of people listing both objects divided by the total number of people listing the greater object throughout the entire database.
For each unique combination of two objects, calculate a third value representing a weighted average of the first two values. The weighted average can range from 100% of the first value and 0% of the second value to 0% of the first value and 100% of the second value.
Create for each object a ranking, from maximum to minimum, of all other objects as determined by the weighted average value calculated above.
Use this final ranking to provide a list of similarly liked objects.

Figure 6A:
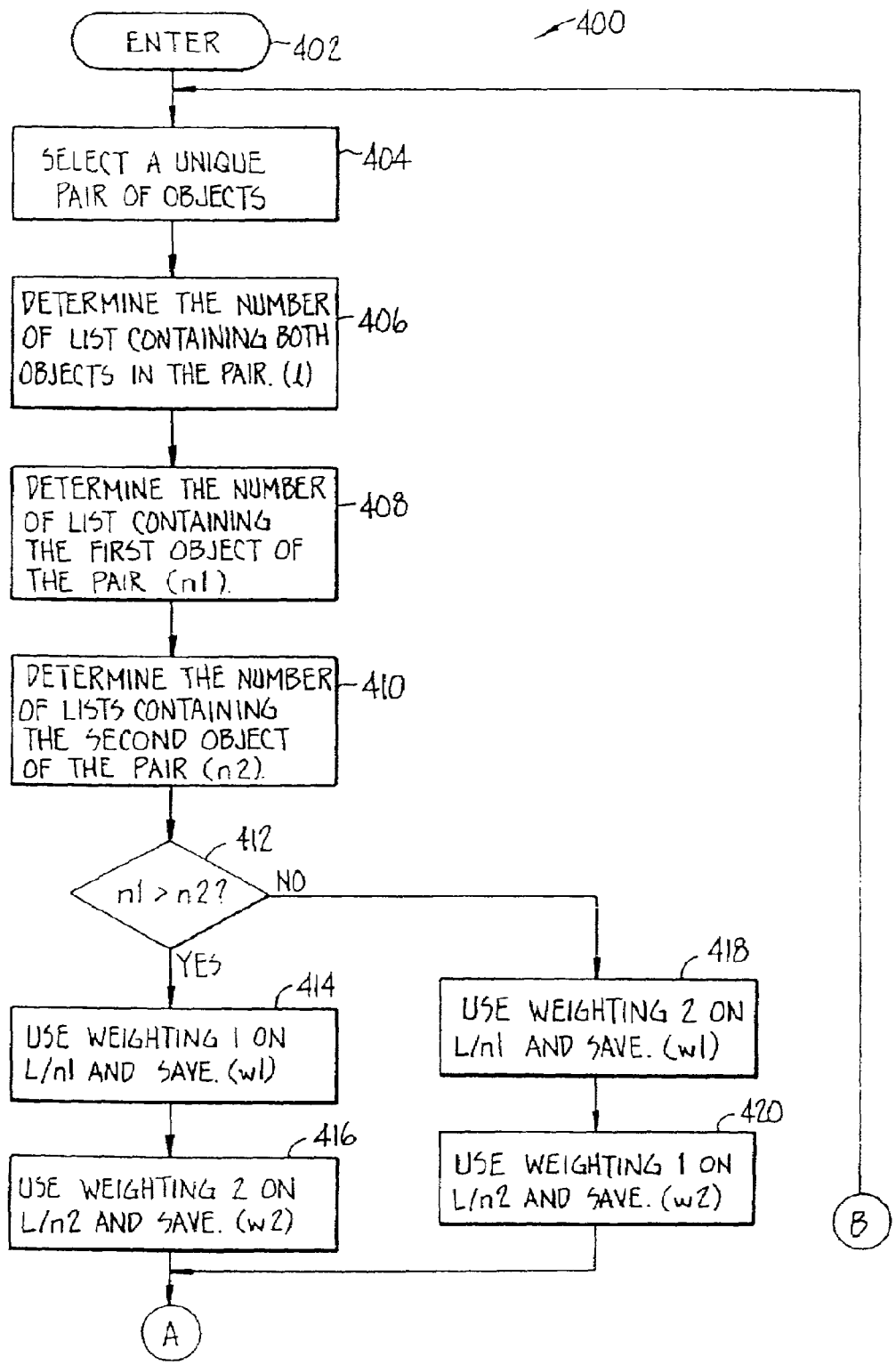
FIG. 6A is an illustration of a first half of a flowchart describing a routine of the present invention.
Figure 6B:
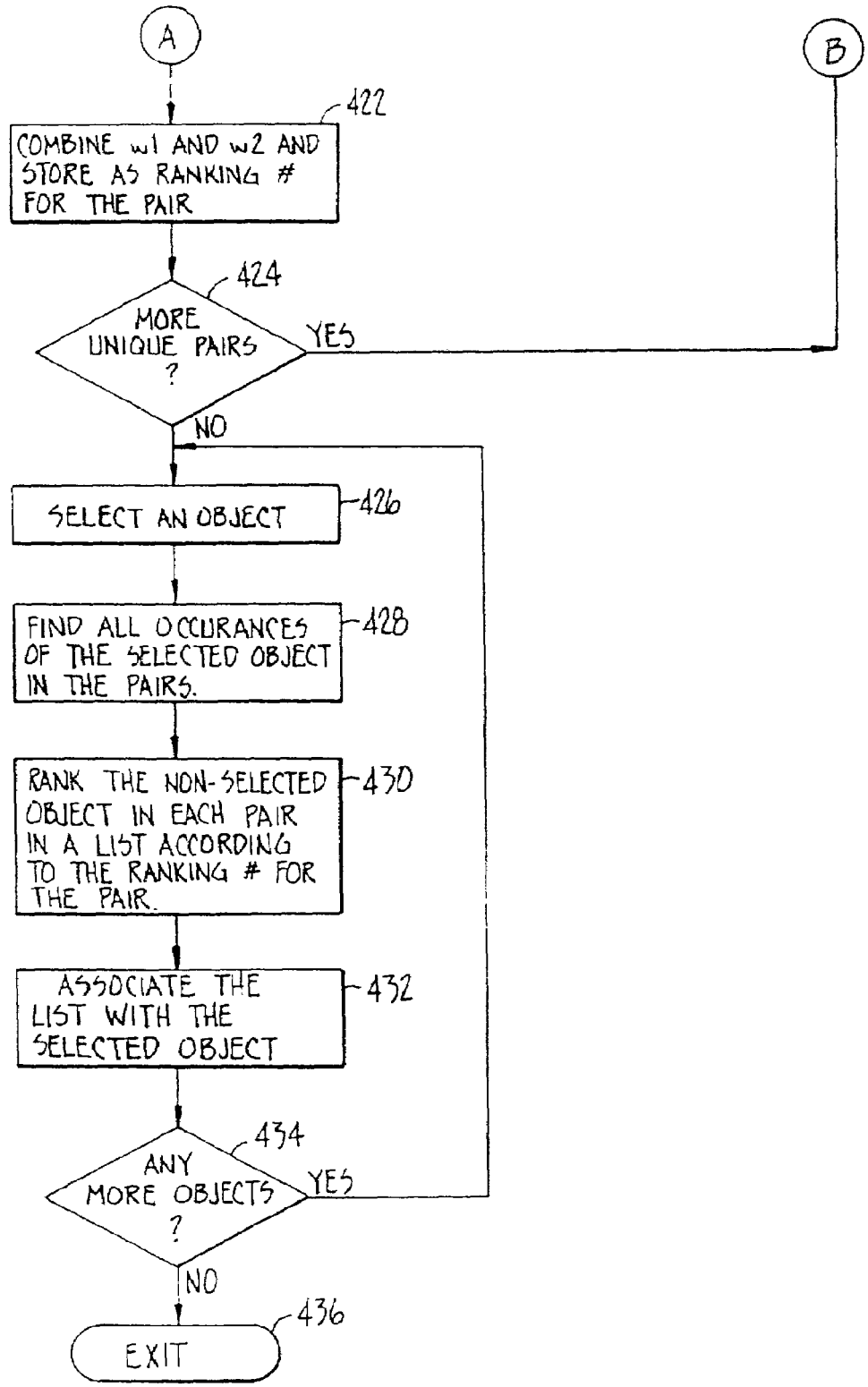
FIG. 6B is an illustration of a second half of a flowchart describing a routine of the present invention.

FIGS. 6A and 6B show flowchart 400 of a routine that executes the steps of Table 2. In FIG. 6A, routine 400 is entered at 402. It is assumed that first and second weighting factors, referred to as "weighting1" and "weighting2" are defined at the time of entry of the routine.

The values for the weighting factors are variable at the control panel, as described above, or by other suitable means. It is further assumed that a database of preference lists such as database 302 of FIG. 4, including lists 304, 306, 308 and 310 exists.

At step 404, a unique pair of objects is chosen. In the example discussed above, where objects are names of recording artists, step 404 chooses two artists' names from the possible names in the database. At step 406 the number of lists containing both objects in the pair is determined. For ease of discussion, we represent this number as "L".

Referring to FIG. 4, for example, if the pair "ad" is selected, lists 304 and 310 include the pair since they each include both object "a" and object "d" whereas lists 306 and 308 do not include the pair.

At step 408, the number of lists containing the first object of the pair, in this case "a", is determined. This number is represented as "n1" in this discussion. In our example of FIG. 4, database 302 shows three lists, namely lists 304, 308, and 310, containing the object "a". Thus, n1 would be set to 3.

In step 410, the number of lists containing the second object of the pair, in this case "d", is determined and represented as "n2". In this case, n2 would also be set to 3 since lists 304, 306 and 310 each contain the object "d".

At step 412 a check is made as to whether n1 is greater than n2. Assuming n1 is greater than n2, execution proceeds to step 414 where "weighting1" is used as a weighting factor with n1. The result of the weighting operation using weighting1 and n1 is represented as w1. In a description of the preferred embodiment described below, '1' is divided by the value n1 before the weighting factor is used on the result of the division. However, any manner of using the weighting factors on the number of lists containing the predetermined object is within the scope of the invention.

Next, step 416 is executed whereby weighting factor "weighting2" is applied to the value n2. This result is designated as w2.

Assuming, at step 412, that n1 is not greater than n2, execution proceeds to step 418 where, in contrast to step 414, weighting factor "weighting2" is used on the value n1. The result of this is again designated w1. At step 420, "weighting1" is used as a weighting factor on n2 and the result is designated w2.

Thus it can be seen that, depending on the relationship of n1 as greater than, or less than or equal to, n2, the weighting factors are applied in a first or second order to the numbers that designate the number of lists containing first and second objects, respectively, in the selected pair.

Flowchart 400 is continued in FIG. 6B according to the connection circles "A" and "B".

FIG. 6B shows step 422 executed subsequently to either of steps 416 or 420. At step 422, the results w1 and w2 are combined and stored as a ranking number, "ranking#," for the selected pair. At step 424, a check is made as to whether there are more unique pairs to be processed. If so, execution returns to step 404. If not, execution continues to steps 426-434 where the ranking# of each of the pairs processed above is used to create an ordered list of selections associated with each of the pairs.

At step 426, an object from the data is selected to generate pairs. For example, with object "a", possible pairs (assuming the lists 304, 306, 308 and 310 form the database) are ab, ap, as, ad, al, az, ay, and aq. After executing steps 404-424, described above, each of these pairs will have a ranking# associated with the pair.

At step 428, all occurrences of the selected object in pairs is determined. This is merely the list of pairs that include the object "a" as listed above. At step 430, the non-selected object in each pair is ranked in a list according to the ranking# for the pair. At step 432, the list is associated with the selected object.

At step 434 a check is made to see whether there are any more objects to be processed. If so, execution returns to step 424, where another unprocessed object is selected. After all the objects have been processed, execution falls to step 436 where the routine of flowchart 400 is exited. At the completion of the routine each unique object in the database will have an associated ranked list. The ranked lists are indicative of the popularity of the ranked artists among users of the system that have also chosen the selected object, or selected artist. Thus, the ranked lists provide a way to recommend artists to a user given that the user prefers the selected artist.

Figure 7:
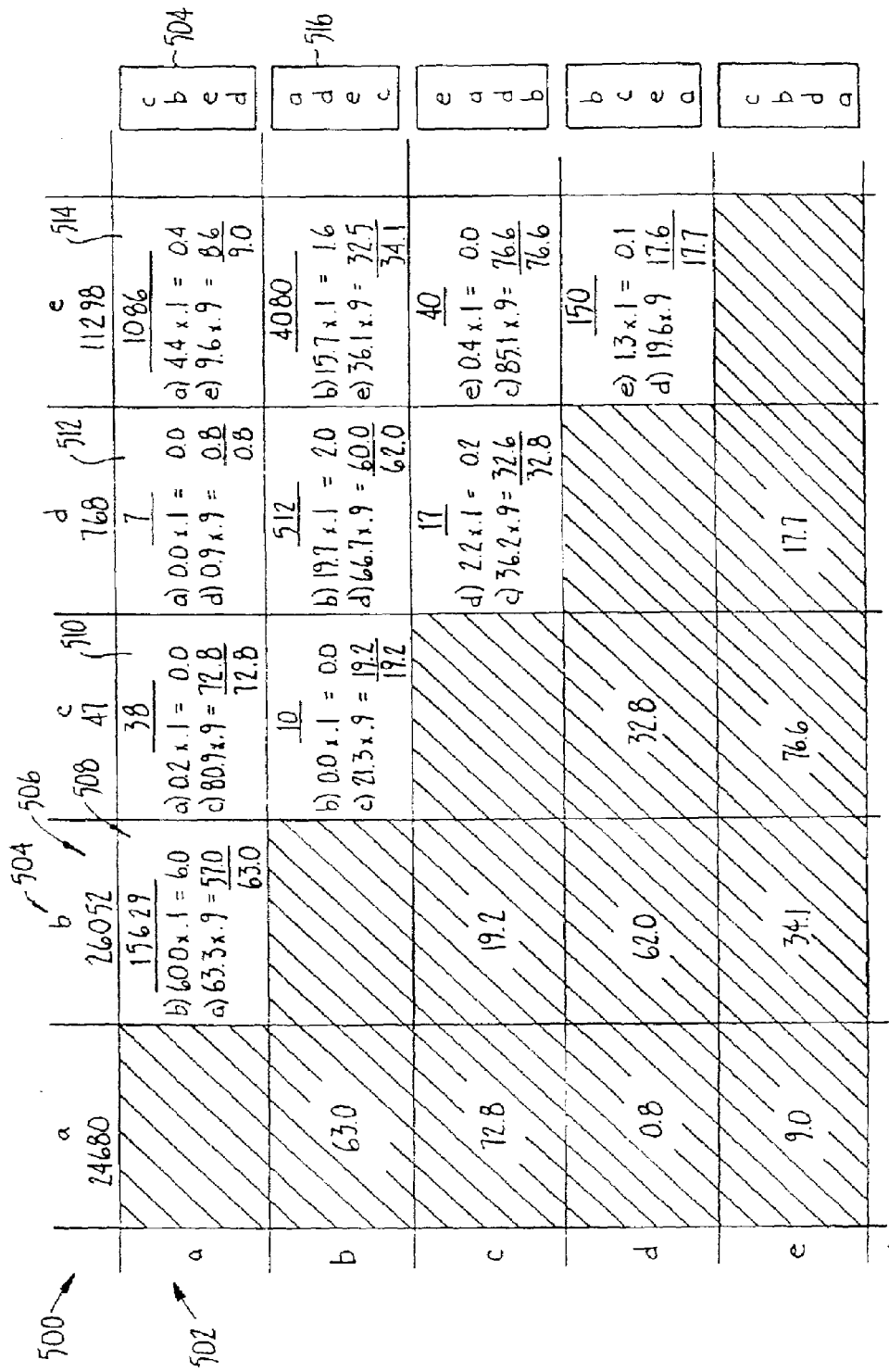
FIG. 7 shows a table illustrating the method described in Table 2 and FIGS. 6A and 6B.

FIG. 7 shows Table 500 to further illustrate the method described in Table 2 and FIGS. 6A and 6B.

In FIG. 7, Table 500 shows names of objects in the database along the top and left sides of the table. Table 500 shows only a portion of the objects in the database for ease of discussion. For each row in Table 500 an object, such as object 502, is designated. At the right of the row is the ranked list associated with the object. For object 502, list 504 is the associated list. Note that list 504 shows objects c, b, e, and d ranked in that order.

Next, a discussion of the derivation of the ranked lists of FIG. 7, such as ranked list 504, is presented.

The top of Table 500 of FIG. 7 shows an object, such as object 504, associated with a number, such as number 506. Thus, in FIG. 7, object b is associated with the number 26052. This number is the frequency of object b in the database. That is, object b occurs in 26052 different lists in the database. Similarly, object a occurs 24680 times, object c occurs 47 times, object d occurs 768 times and object e occurs 11298 times.

Each box within the body of Table 500 represents statistics on the pair given by the row and column corresponding to the box. For example, box 508 includes statistics on the pair of objects a and b. The top number in the box, 15629, is the number of lists in the database that includes both of the objects in the pair, that is, a and b. The second line in the box shows the object of the pair that occurs most frequently in lists in the database. Thus, in box 508, object b occurs more frequently in the database than object a. This is verified by noting that b occurs 26052 times and that a occurs 24680 times.

The number 60.0 results from dividing the number of occurrences of the pair ab by the number of lists that contain the more frequently occurring object, b. In other words, 60.0 is the result of dividing 15629 by 26052. This number is shown multiplied by 0.1 to yield a result of 6.0. 0.1 is the first weighting factor and is the same for each of the calculations in each of the boxes of Table 500.

Similar to the above, the next line in box 508 shows the object of less frequent occurrence in the database, namely, object a. To the right of the object 'a' designator is the value 63.3. This value was obtained by dividing the frequency of the pair in lists in the database by the frequency of the occurrence of object 'a' in lists in the database. That is, 63.3 is the result of dividing 15629 by 24680. The value 0.9 is the second weighting factor and is used to modify the calculation that includes the number of occurrences of the less frequently occurring object of the pair. This gives a result of 57.0.

Finally, the result of the weighting calculations, that is 6.0 and 57.0, are combined to form a final ranking value of 63.0.

Referring to flowchart 400 of FIG. 6A, at step 404 a unique pair of objects is selected. In FIG. 7, this would be, for example, the selection of objects a and b at 502 and 504. At step 406, the number of lists containing both objects in the pair is determined. This is the number 15629 of box 508 of FIG. 7. At step 408, the number of lists containing the first object of the pair is determined. The arbitrary first object of the pair is object a and the number of lists containing object a is shown in Table 500 as 24680. Similarly, step 410 of FIG. 6A determines the number of lists containing the second object of the pair, or object b. In Table 500 of FIG. 7, this is the number 26052. Note that numbers such as 24680 and 26052 are obtained by scanning the preference lists in the database such as preference lists 304, 306, 308 and 310 of database 302 shown on FIG. 4. This scanning can be by any means known in the art.

At step 412, a check is made as to which of the first or second objects in the pair occurs with the highest frequency in the lists. This check, along with steps 414-420, is used to apply first and second weighting factors, designated weighting1 and weighting2, to a number that is based on the frequency of occurrence of each of the objects of the pair in lists in the database. For example, weighting1 has the value 0.1 and weighting2 has the value 0.9.

Simply put, the steps 412-420 will always apply weighting1, or 0.1, to the calculation using the number of occurrences of the more frequently occurring object in the pair. Weighting factor "weighting2" is always applied to the number of occurrences of the less frequently occurring object. Thus, in box 508, 0.1 is applied to a calculation using the number of occurrences of object b while 0.9 is applied to a calculation using the number of occurrences of object a. In boxes 510, 512, and 514, object a occurs more frequently than its paired object, that is, object c, d, or e, respectively. Thus, in each of boxes 510, 512 and 514, the calculation involving the number of occurrences of object a is applied with the weighting factor of 0.1.

The result in each of the boxes, such as the result 63.0 in box 508, is used to rank the second object of the pair in a list where the list is then associated with the first object in the pair. Thus, object c with a result of 72.8 is ranked at the top of list 504. Similarly, objects b, e and d are ranked successively in list 504. List 504 is then associated with object a.

The second row of table 500 shows that object b has list 516 associated with it and that list 516 includes objects a, d, e and c. Similarly, objects c, d and e each have a list associated with them as shown by the object and associated list at opposite ends of each of the rows of Table 500 of FIG. 7. Note that the diagonal boxes of Table 500 need not be computed since it is irrelevant to have a pair of the same object, such as pairing object a with object a. Also, the lower left triangular portion of Table 500 does not need to be computed since the computation is identical for its counterpart across the main diagonal of the table.

Once the lists of table 500 have been derived, recommended selections of objects based on a given object can be obtained from the table. For example, given object a, list 504 would be accessed to return recommendations of objects c, b, e and d in order of descending likelihood of also being preferred by a user who already prefers object a.

Thus, the method of Table 2 is a way to achieve object to object correlation in the present invention.

In the foregoing specification, the invention has been described with reference to specific exemplary embodiments thereof. It will, however, be evident that various modifications and changes may be made thereunto without departing from the broader spirit and scope of the invention as set forth in the appended claims. For example, various programming languages and techniques can be used to implement the disclosed invention. Also, the specific logic presented to accomplish tasks within the present invention as disclosed by the flowcharts may be modified without departing from the scope of the invention. Many such changes or modifications will be readily apparent to one of ordinary skill in the art. The specification and drawings are, accordingly, to be regarded in an illustrative rather than a restrictive sense, the invention being limited only by the provided claims.

What is claimed is:

1. A method for outputting recommended preferences based on predetermined preferences, the method executing on a computer system, the computer system including a processor, database, first input device, and an output device, wherein the database includes a plurality of datafiles each containing a plurality of preferences, the method comprising the following steps:
    a) accepting signals from the first input device to indicate a plurality of user preferences;
    b) using the processor to search the database and to determine the number of user preferences that match preferences in a given datafile;
    c) using the processor to identify datafiles with a number of matching preferences above a first threshold number;
    d) selecting preferences from the identified datafiles, wherein the selected preferences do not match the user preferences;
    e) for each unmatching preference in the related datafiles, performing a submethod comprising:
        e1) determining a first number of related datafiles in which the unmatching preference occurs;
        e2) determining a second number of all datafiles in the database in which each unmatching preference occurs; and
        e3) determining a third number as the proportion of the first and second determined numbers;
    f) determining a first ranking of said selected unmatching preferences from the related datafiles based on said first determined numbers;
    g) determining a second ranking of said selected unmatching preferences from the related datafiles based on said third determined numbers;
    h) selecting one or more recommended preferences based on a weighted combination of said first ranking and said second ranking; and
    i) outputting via the output device, the recommended preferences.

2. The method of claim 1, wherein the user preferences comprise artist's name.

3. The method of claim 1, wherein the user preferences comprise a title of a movie.

4. The method of claim 1, wherein the computer system further includes a data communications network and a second input device,
    wherein the processor, database, first input device, second input device and output device are coupled to the network,
    wherein the first and second user input devices are remotely located from each other.

5. The method of claim 1, wherein the number of preferences in a datafile is limited to 10, and wherein the first threshold number is 5.

6. The method of claim 1, wherein the number of preferences in a datafile is limited to 10, and wherein only those unmatching preferences that also appear in 50% or more of the related datafiles are selected as recommended preferences.

7. A computer-readable medium having stored thereon instructions that, when executed, perform a method for outputting recommended preferences based on predetermined preferences, the method executing on a computer system, the computer system including a processor, database, first input device, and an output device, wherein the database includes a plurality of datafiles each containing a plurality of preferences,
the method comprising the following steps:
    a) accepting signals from the first input device to indicate a plurality of user preferences;

b) using the processor to search the database and to determine the number of user preferences that match preferences in a given datafile;
c) using the processor to identify related datafiles with a number of matching preferences above a first threshold number;
d) selecting preferences from the related datafiles, wherein the selected preferences do not match the user preferences;
e) for each unmatching preference in the related datafiles, performing a submethod comprising:
  e1) determining a first number of related datafiles in which the unmatching preference occurs;
  e2) determining a second number of all datafiles in the database in which each unmatching preference occurs; and
  e3) determining a third number as the proportion of the first and second determined numbers;
f) determining a first ranking of said selected unmatching preferences from the related datafiles based on said first determined numbers;
g) determining a second ranking of said selected unmatching preferences from the related datafiles based on said third determined numbers;
h) selecting one or more recommended preferences based on a weighted combination of said first ranking and said second ranking; and
i) outputting via the output device, the recommended preferences.

8. A computer apparatus having a processor and memory containing computer executable instructions that, when executed by the processor, perform a method for outputting recommended preferences based on predetermined preferences, the method executing on a computer system, the computer system further including a database, first input device, and an output device, wherein the database includes a plurality of datafiles each containing a plurality of preferences, the method comprising the following steps:
  a) accepting signals from the first input device to indicate a plurality of user preferences;
  b) using the processor to search the database and to determine the number of user preferences that match preferences in a given datafile;
  c) using the processor to identify related datafiles with a number of matching preferences above a first threshold number;
  d) selecting preferences from the related datafiles, wherein the selected preferences do not match the user preferences;
  e) for each unmatching preference in the related datafiles, performing a submethod comprising:
    e1) determining a first number of related datafiles in which the unmatching preference occurs;
    e2) determining a second number of all datafiles in the database in which each unmatching preference occurs; and
    e3) determining a third number as the proportion of the first and second determined numbers;
  f) determining a first ranking of said selected unmatching preferences from the related datafiles based on said first determined numbers;
  g) determining a second ranking of said selected unmatching preferences from the related datafiles based on said third determined numbers;
  h) selecting one or more recommended preferences based on a weighted combination of said first ranking and said second ranking; and
  i) outputting via the output device, the recommended preferences.

* * * * *

UNITED STATES PATENT AND TRADEMARK OFFICE
CERTIFICATE OF CORRECTION

PATENT NO. : 7,461,055 B2
APPLICATION NO. : 11/383734
DATED : December 2, 2008
INVENTOR(S) : John Atcheson and James R. Miller, III It is certified that error appears in the above-identified patent and that said Letters Patent is hereby corrected as shown below:

Title Pg, Item (63) Rel. U.S. Application Data
The U.S. Application Data reads "Continuation of application No. 09/874,563, filed on Jun. 5, 2001, now Pat. No. 7,050,988, which is a continuation of application No. 08/707,773, filed on Sep. 4, 1996, now abandoned." should read --Continuation of application No. 09/874,563, filed on Jun. 5, 2001, now Pat. No. 7,050,988, which is a continuation of application No. 08/707,773, filed on Sep. 4, 1996, now abandoned, which is a Continuation of application No. 08/119,793, filed on Sep. 9, 1993, now Pat. No. 5,583,763.--.

Column 2, line 39 "matching preferences in the data file are output as recom-..."" should be changed to --matching preferences in the datafile are output as recom-...--.

Column 14, line 11 "c) using the processor to identify datafiles with a number of..." should be changed to --c) using the processor to identify related datafiles with a number of matching...--.

Column 14, line 13 "d) selecting preferences from the identified datafiles,..." should be changed to --d) selecting preferences from the related datafiles, wherein the selected preferences do...--.

Column 14, line 37 "...comprise artist's name." should be changed to --...comprise an artist's name--.

Signed and Sealed this

Twelfth Day of May, 2009

JOHN DOLL
*Acting Director of the United States Patent and Trademark Office*